United States Patent [19]
Utamura et al.

[11] Patent Number: 5,791,136
[45] Date of Patent: Aug. 11, 1998

[54] COMBINED-CYCLE POWER GENERATION PLANT, INCLUDING A GAS TURBINE, AN ANNUAL EXHAUST GAS CHANNEL HAVING SWIRL SUPPRESSION VANES, AND A HEAT RECOVERY BOILER

[75] Inventors: Motoaki Utamura; Seiichi Kirikami, both of Hitachi, Japan

[73] Assignee: Hitachi, Ltd., Tokyo, Japan

[21] Appl. No.: 508,898

[22] Filed: Jul. 28, 1995

[30] Foreign Application Priority Data

Aug. 23, 1994 [JP] Japan ................... 6-198160

[51] Int. Cl.⁶ .................................................. F01D 7/00
[52] U.S. Cl. .................. 60/39.182; 60/39.5; 415/211.2; 415/115
[58] Field of Search ................... 60/39.182, 39.5, 60/39.511; 415/211.2, 115; 122/7 R

[56] References Cited

U.S. PATENT DOCUMENTS

| | | | |
|---|---|---|---|
| 2,844,001 | 7/1958 | Alford | 60/39.5 |
| 3,156,437 | 11/1964 | Mercier | 60/39.5 |
| 3,802,187 | 4/1974 | Titus | 60/39.5 |
| 3,930,367 | 1/1976 | Gasparoli | 60/39.182 |
| 4,013,378 | 3/1977 | Herzog | 415/211.2 |
| 5,102,298 | 4/1992 | Kreimeier | 415/211.2 |
| 5,338,155 | 8/1994 | Kreitmeier | 415/211.2 |
| 5,346,365 | 9/1994 | Matyscak | 415/211.2 |
| 5,431,009 | 7/1995 | Bauver, II | 60/39.182 |
| 5,461,853 | 10/1995 | Vetterick | 60/39.182 |

FOREIGN PATENT DOCUMENTS

| 0117125 | 5/1988 | Japan | 60/39.5 |
|---|---|---|---|
| 63-100640 | 6/1988 | Japan . | |

*Primary Examiner*—Timothy Thorpe
*Assistant Examiner*—Ted Kim
*Attorney, Agent, or Firm*—Fay, Sharpe, Beall, Fagan, Minnich & McKee

[57] ABSTRACT

To provide a combined-cycle power generation plant heat exchanged effectively in an exhaust heat, the recovery boiler is increased by suppressing on reducing the swirl present in the exhaust gas of a gas turbine. That is, a plurality of stationary blades 10 are arranged on the surface of a rear inner barrel in the circumferential direction of the rear inner barrel to partition an annular channel formed between a casing and the rear inner barrel. Thereby, it is possible to uniform the flow of exhaust gas with a low pressure drop.

7 Claims, 6 Drawing Sheets

EXHAUST STRUCTURE

COMBINED-CYCLE POWER GENERATION PLANT, INCLUDING A GAS TURBINE, AN ANNUAL EXHAUST GAS CHANNEL HAVING SWIRL SUPPRESSION VANES, AND A HEAT RECOVERY BOILER

BACKGROUND OF THE INVENTION

1. Field of the Invention

The present invention relates to a combined-cycle power generation plant (hereafter referred to as a plant) provided with a gas turbine and an exhaust heat recovery boiler.

Particularly, the present invention relates to a plant in which the flow velocity distribution of exhaust gas discharged from the gas turbine and supplied to the exhaust heat recover boiler is almost made uniform.

2. Description of the Related Art

A technique for making uniform the flow velocity distribution of exhaust gas of a turbine is disclosed in, for example, Japanese Utility Model Laid-Open No. 100640/1988. The publication discloses a gas exhaust structure of a turbine in which a hollow strut provided with a gas intake port is formed at a rear boss. The structure is so constituted as to lead part of the gas into the strut and jet the gas in the direction of the central axis on the downstream side of the rear boss.

Thereby, a low-flow-velocity area is prevented from occurring at the central portion of the exhaust duct.

However, in the art disclosed in the publication, there is a velocity component in the circumferential direction of the exhaust gas discharged from a cascade of the turbine; that is, swirl is not taken into consideration.

SUMMARY OF THE INVENTION

It is an object of the present invention to improve the heat recovery efficiency of an exhaust heat recovery boiler by suppressing or reducing swirl of the exhaust gas of a gas turbine, thereby supplying the exhaust gas to the exhaust heat recovery boiler.

A plant of the present invention is provided with a gas turbine and an exhaust gas recovery boiler. An annular exhaust-gas channel for flowing the exhaust gas discharged from the gas turbine is provided between the gas turbine and the exhaust heat recovery boiler. The channel comprises an inner barrel formed on the downstream side of the gas turbine and a casing of the gas turbine.

The gas turbine comprises a compressor for drawing in and compressing the atmospheric air, a combustor for burning the compressed air supplied from the compressor and the fuel, and a cascade of the turbine driven by the combustion gas supplied from the combustor. The exhaust heat recovery boiler exchanges heat with the exhaust gas supplied from the gas turbine through the channel by means of the water flowing through a pipe to produce steam. It is preferable that the steam produced by the boiler is lead to a steam turbine.

The plant may be a single-shaft plant in which a gas turbine is connected with a steam turbine by one shaft and a generator is used in common, or may be a multiple-shaft plant in which a gas turbine and a steam turbine have respective generators.

The channel has a stationary blade extending in the axial direction.

Because exhaust gas passes through a cascade having a stationary blade and a moving blade serving as a rotating blade, it forms a swirl having an axial component and a circumferential component (swirl component). The stationary blade is formed to control the swirl component of exhaust gas.

It is preferable that the stationary blade is formed at the outer periphery of the inner barrel. It is preferable that a plurality of stationary blades are radially arranged in the radial direction.

The channel is also defined as a channel comprising an inner barrel and a rear edge boss connected with the inner barrel, and a casing and a diffuser connected with the casing. In this case, it is preferable that the stationary blade is so formed as to extend from part of the inner barrel to part of the rear edge boss.

Moreover, it is preferable that the stationary blade is provided with slits (flowing holes) for allowing exhaust gas to flow therethrough. It is preferable that a plurality of slits are formed in the side of the stationary blade in the circumferential direction and extended in the radial direction ranging over the axial direction and extended in the radial direction of the channel (ex. 50–98%).

The rear edge boss is so formed that the radius of the boss decreases toward the downstream side. And, it is preferable that the rear edge boss is so formed that its axial length is three to six times larger than the diameter of the inner barrel (portion where the rear edge boss is connected to the inner barrel).

Furthermore, it is preferable that the number and axial length of the stationary blades are so determined that nX/D ranges from 5 to 20, where n is the number of stationary blades, X is the axial length of the stationary blades, and D is the diameter of the inner barrel.

Because the present invention deflects the swirl component present in the exhaust gas of a gas turbine to the axial component by stationary blades, it is possible to almost eliminate the swirl component at the entrance of an exhaust heat recovery boiler.

Moreover, because slits are formed, it is possible to allow the exhaust gas to flow from the sides of the stationary blades which the exhaust gas hardly strikes to the backs of the stationary blades, that is, the sides of the stationary blades which the exhaust gas strikes. In other words, it is possible to almost equalize the static pressure produced on the side where the flow velocity of exhaust gas is high with the static pressure produced on the side where the flow velocity of exhaust gas is low. Therefore, it is possible to almost eliminate the unevenness of the exhaust-gas flow velocity distribution between stationary blades due to the difference between the static pressures.

Furthermore, by forming openings (ex. slits) extending in the axial direction, it is possible to gradually decrease the difference between the static pressures from the upstream side to the downstream side of the stationary blades. Therefore, it is possible to almost eliminate the difference between the static pressures on the downstream side of the stationary blade. Furthermore, by forming slits extending in the axial direction, it is possible to almost eliminate the difference between the static pressures from the central side toward the outside of the channel.

The rear edge boss is so formed that the radius of the boss gradually decreases toward its downstream side, and a discontinuous expanded portion of the cross section of the channel is eliminated because the axial length of the rear edge boss is three to six times larger than the diameter of the inner barrel. Therefore, it is possible to prevent a circulating flow from occurring in the downstream area of the rear edge of the inner barrel.

3

According to the present invention, the heat recovery efficiency of an exhaust heat recovery boiler is improved by straightening the flow of the exhaust gas supplied to the boiler because means for suppressing the swirl component of the swirl present in exhaust gas of a gas turbine is used.

Moreover, circulative flow due to sudden expansion of the channel at the rear edge of the inner barrel is suppressed by compensating for the sudden expansion by the rear edge boss. Thereby, it is possible to lead exhaust gas to the exhaust heat recovery boiler with an almost uniform flow-velocity distribution. Further, the pressure drop is small.

In general, to improve the heat transmission efficiency, it is necessary to improve the heat flux. The heat flux is determined by the flow velocity of exhaust gas. It is experientially known that the region where the flow velocity is low in a pipe in an exhaust heat recovery boiler lowers the efficiency. Therefore, the region where the flow velocity is low is eliminated by making the flow velocity distribution uniform to improve the plant efficiency.

Furthermore, a plant of the present invention is provided with a gas turbine; an annular exhaust gas channel constituted by a diffuser, an inner barrel, and a part of the casing for the gas turbine, all of which are disposed on the downstream side of the gas turbine; an exhaust heat recovery boiler for producing steam by using exhaust gas of the gas turbine led through the channel; and a steam turbine driven by the steam.

Furthermore, a plant of the present invention having the stationary blades allows the exhaust gas to flow in the peripheral direction of the inner barrel.

DESCRIPTION OF THE PREFERRED EMBODIMENT

An embodiment of the present invention will be described below referring to the accompanying drawings.

Figure 1:
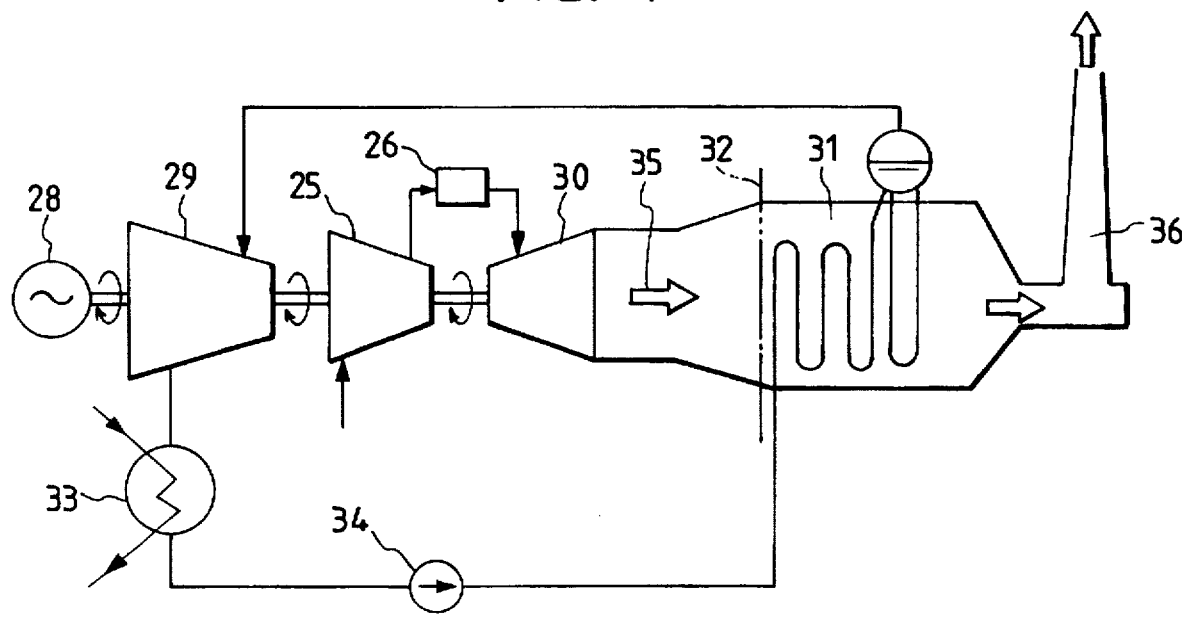
FIG. 1 is a block diagram of an axial flow exhaust plant to which the invention is applied.

FIG. 1 shows the constitution of a plant of the embodiment.

The plant is a single-shaft plant in which a generator 28, a steam turbine 29, a compressor 25, and a cascade of a turbine (gas turbine) 30 are arranged on almost the same straight line. The rotational (kinetic) energy of the steam turbine 29 and the gas turbine 30 is converted into electric energy by the generator 28. An exhaust heat recovery boiler 31 is also formed in the axial direction of the gas turbine 30. This plant is a so-called axial flow exhaust plant in which exhaust gas 35 discharged from the gas turbine 30 flows in the axial direction and is supplied to the exhaust heat recovery boiler 31.

A combustor 26 burns a mixture of fuel and compressed air supplied from the compressor 25 for drawing in and compressing the atmospheric air. The gas turbine 30 is driven by the combustion gas supplied from the combustor 26. The exhaust gas 35 discharged from the gas turbine 30 is led to the exhaust heat recovery boiler 31. Then, the gas 35 exchanges heat with the water flowing through a pipe to produce steam. The steam turbine 29 is driven by the produced steam. The steam discharged from the steam turbine 29 is condensed in a condenser 33 and led to the exhaust heat recovery boiler 31 through a feed water pump 34. The exhaust gas heat-exchanged in the exhaust heat recovery boiler 31 is discharged to the atmospheric air from a smokestack 36.

In the axial flow exhaust plant various units are compactly arranged and their installation space is small.

In the case of the axial flow exhaust plant, because the gas turbine 30 and the exhaust heat recovery boiler 31 are arranged on almost the same straight line, drift of exhaust gas influences the heat exchange in the exhaust heat recovery boiler 31.

Figure 2A:
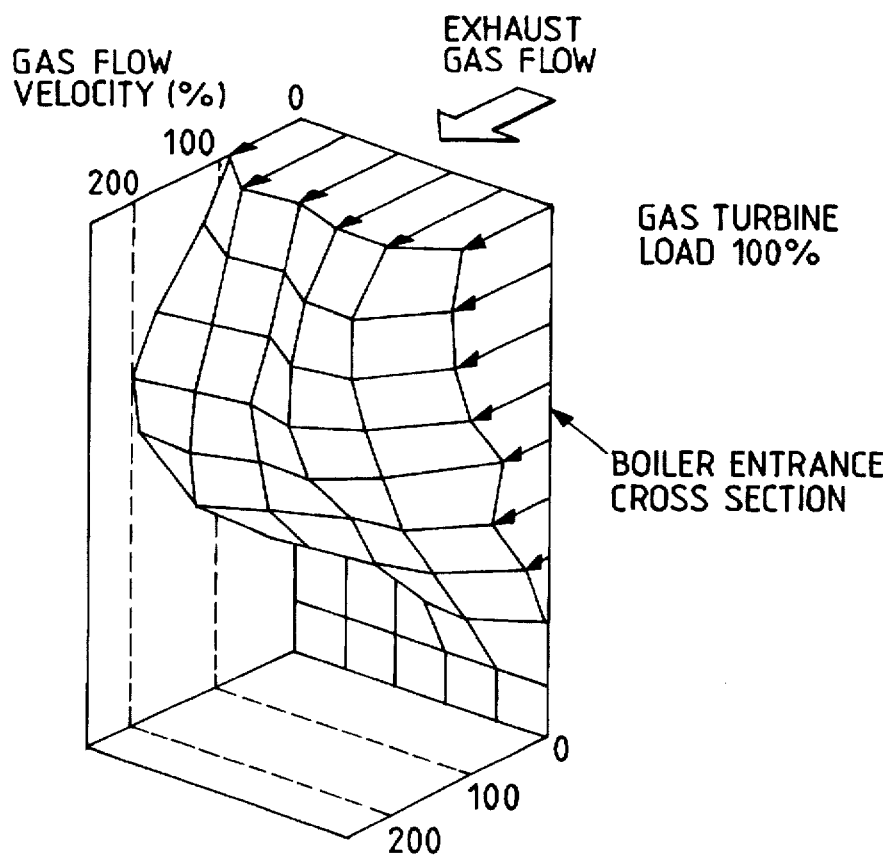
FIGS. 2a and 2b are illustrations showing the flow velocity distribution of exhaust gas at the boiler-entrance cross section.
Figure 2B:
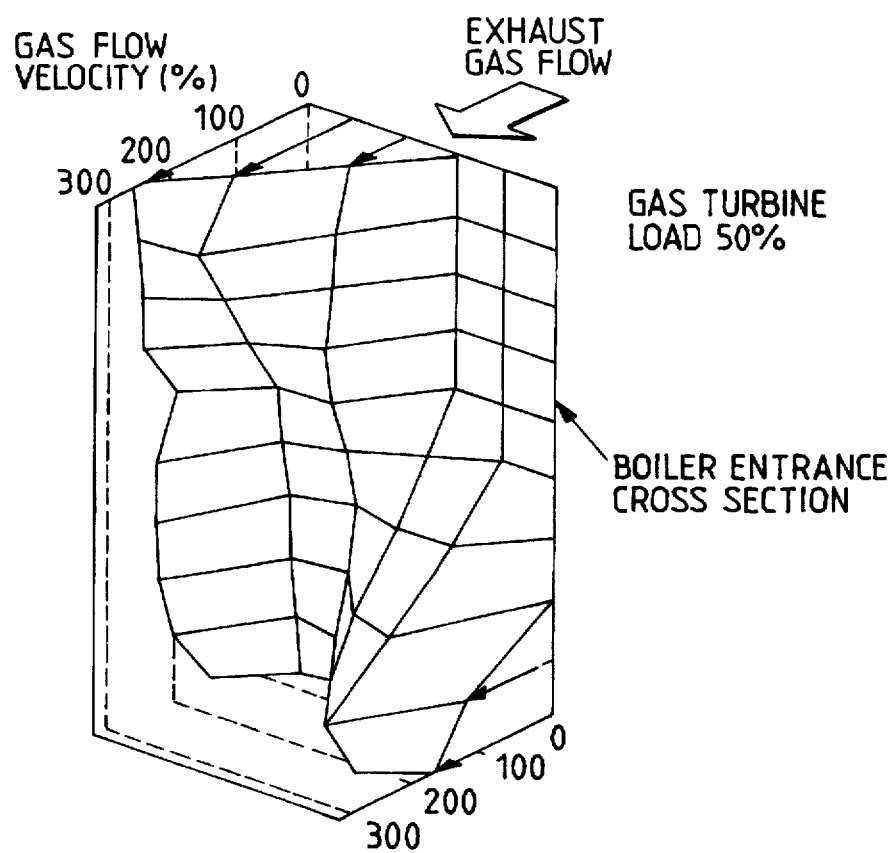

FIGS. 2a and 2b show the flow velocity (average flow velocity) distributions of the exhaust gas 35 on a heat transfer pipe (pipe) plane 32 (boiler entrance cross section) of the exhaust heat recovery boiler 31 shown in FIG. 1.

FIG. 2a shows the state that the load of a gas turbine is 100% and FIG. 2b shows the state that the load of the gas turbine is 50%. As will be seen from FIGS. 2a and 2b, the distribution greatly depends on the load. When the load is 100%, inflow of the exhaust gas into the lower part of the boiler is small. When the load is 50%, inflow of the gas into the top right corner of the boiler is small.

In a region where the gas flow velocity is low the heat transfer coefficient is small. Therefore, the quantity of heat to be exchanged between the high temperature exhaust gas and the fluid in a heat transfer pipe is small. Experientially, the exchanged quantity of heat of the whole boiler increases as the flow velocity distribution becomes uniform and the recovery of heat of exhaust gas is efficiently performed.

In the axial flow exhaust plant, drift contained in exhaust gas of the gas turbine reaches the boiler without being straightened. Therefore, the flow velocity of the gas entering the heat transfer pipe plane 32 shows a large spatial distribution in the channel cross section.

In the disclosed embodiment, the spatial distribution of the gas flow velocity is improved and the plant efficiency of the axial flow exhaust plant is raised. That is, when drift is present in the exhaust gas, the drift is suppressed and the lowering of the plant efficiency is prevented.

Means for suppressing drift will be described referring to FIG. 3.

Figure 3:
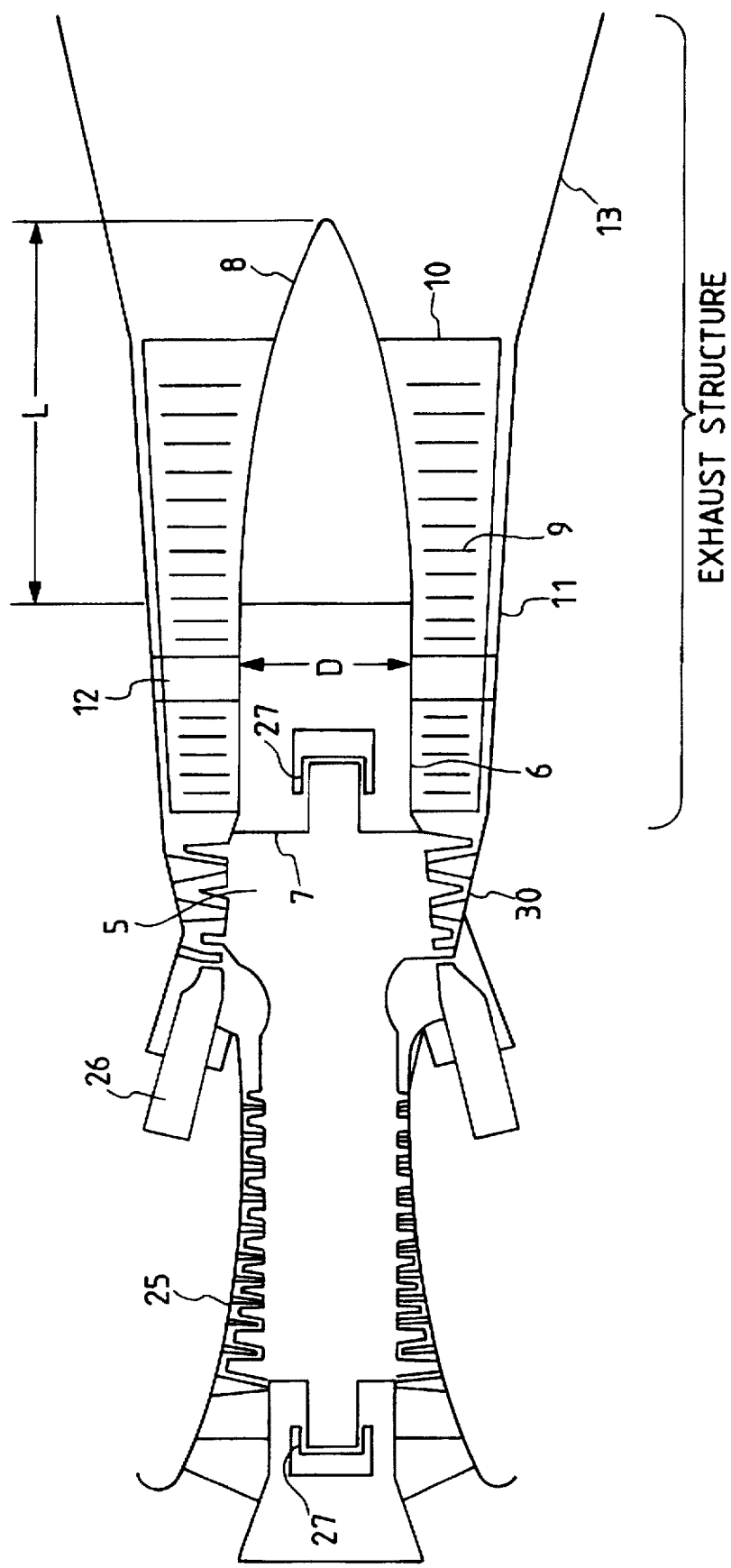
FIG. 3 is an illustration showing the exhaust gas structure of a gas turbine to which the present embodiment is applied.

FIG. 3 shows an exhaust structure for exhaust gas.

The compressor 25 and the rotating blades of the gas turbine 30 are formed on a front inner barrel 5. The front inner barrel 5 rotates, being supported by a bearing 27. The front inner barrel 5 is separated from a rear inner barrel 6 at a boundary 7.

A rear edge boss 8 is formed on the downstream side of the rear inner barrel 6. Stationary blades, or vanes, 10 extending in the axial direction are formed on the surfaces of the rear inner barrel 6 and the rear edge boss 8. The plurality of stator blades 10 are arranged in the circumferential direction of the rear inner barrel 6, which partition a casing (outer barrel) 11, a diffuser 13, and a part of an annular channel formed between the rear inner barrel 6 and the rear edge boss 8. Slits 9 serving as flow holes are formed in the stationary blades 10.

The rear inner barrel 6 and the rear edge boss 8 are supported by the casing 11 and a strut 12.

The strut 12 is used to provide mechanical strength by securing the rear inner barrel 6 to the casing 11. Therefore, though the axial length of the strut 12 is generally small, it is also possible to use the strut 12 as a substitute for the stationary blade 10 by increasing its axial length. Moreover, it is possible for the strut 12 to serve as part of the stationary blade 10.

The cross section of the annular channel enclosed by the rear edge boss 8 and the diffuser 13 almost continuously increases in its area toward the downstream side.

An air (steam) system or the like for cooling the rotating blade is formed in the rear inner barrel 6 and the air to be used is supplied through the inside of the strut 12.

The diffuser 13 is so formed that the sectional area of the channel increases almost continuously. This increase (inclination) of the sectional area makes it possible to optimize the flow velocity of exhaust gas. An inclination of approximately 11° is preferable and it is set between 7.5° and 20°.

Figure 4:
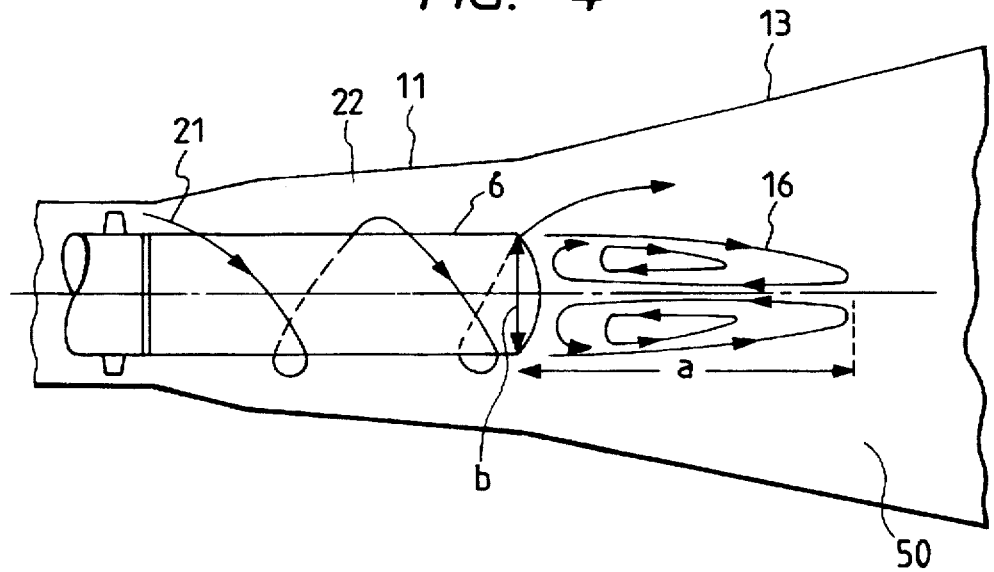
FIG. 4 is an illustration showing the flow pattern of exhaust gas when no stationary blade and no rear edge boss are used.

The shape of the rear edge boss 8 is determined by considering the phenomenon shown in FIG. 4.

FIG. 4 typically shows a flow pattern of exhaust gas in the annular channel when no rear edge boss is formed.

The exhaust structure shown in FIG. 4 comprises an annular channel 22 formed between the rear inner barrel 6 and the casing 11 and the diffuser 13. It is experientially known that swirls 21 are formed in the annular channel 22 and circulative flows 16 are formed on the downstream side of the rear inner barrel 6.

When these two types of eddy currents occur, a complex flow pattern is formed in a channel 50 formed by the diffuser 13 because these eddy currents interfere with each other. Thereby, a larger drift occurs in the boiler entrance cross section located on the downstream side of the channel 50.

The swirls 21 causing drift in exhaust gas of a gas turbine are caused by the rotation of the rotating blade of the gas turbine. The circulative flows 16 generated near the rear edge of the rear inner barrel 6 are caused by sudden expansion of the channel.

The swirls 21 are overcome by the stationary vane and the circulative flows 16 are overcome by the rear edge boss.

Moreover, it is known that secondary flows (circulative flows) with a length of a generally occur when a discontinuous expanded portion (width) b is present in the channel. The circulative flows have the relation 6<a/b<12.

In the case of the exhaust structure shown in this embodiment, the expanded portion b corresponds to the radius of the rear inner barrel 6. Therefore, it is preferable to set the length L of the rear edge boss 8 shown in FIG. 3 in the range 3<L/D<6 in view of the relation with the rear inner barrel 6 (diameter D). By constituting such a rear edge boss, it is possible to almost eliminate the circulative flows 16.

Then, the flow of exhaust gas discharged out of a cascade of a turbine will be described below, referring to FIG. 5.

Blades 4 are rotating blades rotating in the direction indicated by arrow 17. The swirl vector 19 of the exhaust gas viewed from a static system is determined by adding a flow-velocity vector 18 of exhaust gas flown out of the blades 4 and the rotational-speed vector 17 of the blades 4. The velocity 17 of the blades 4 is constant independent of the load of the gas turbine.

The gas turbine is connected to a generator. The number of rotations (rotational speed) of the gas turbine directly represents the frequency of the power (load) outputted from the generator. Therefore, to supply electric power with a frequency of 50 Hz, for example, it is necessary to keep the speed of the gas turbine at 3,000 rpm.

An inlet guide vane (IGV) is controlled in accordance with the load of the gas turbine to adjust the quantity of air entering the gas turbine. Therefore, the quantity of air used for the gas turbine changes in accordance with the load and the flow velocity vector 18 differs in magnitude though the direction of the vector is the same.

As a result, the angle $\Phi$ of the vector 19 changes in accordance with the load.

Figure 5:
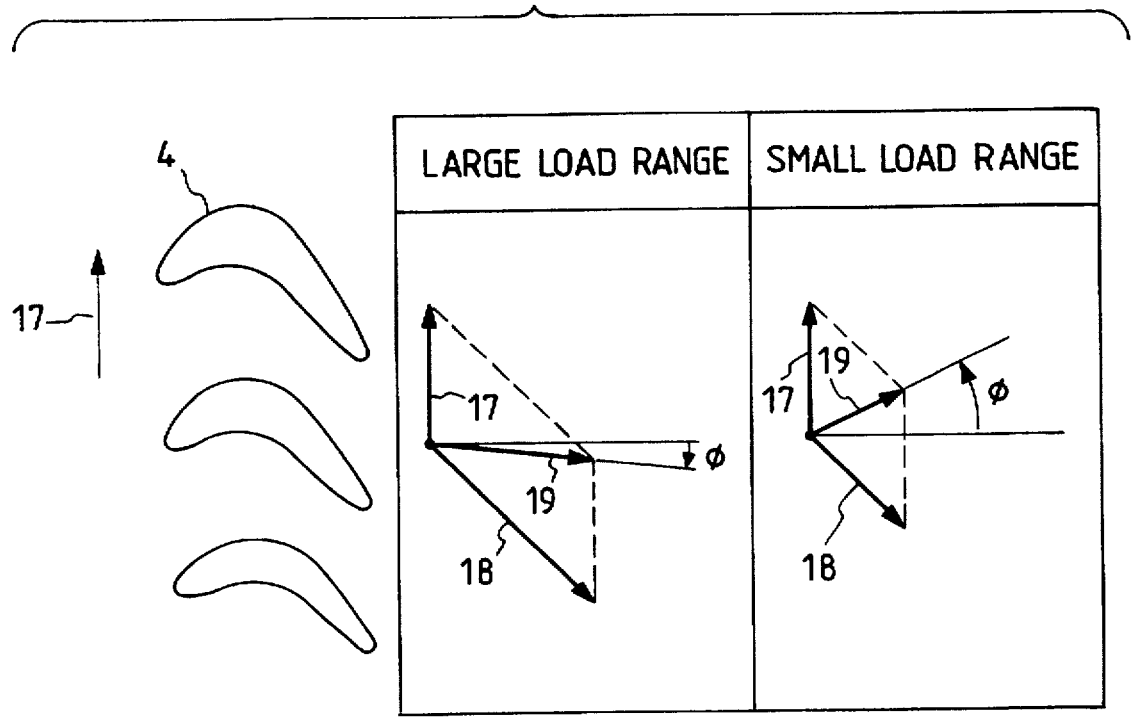
FIG. 5 is an illustration showing a swirl direction corresponding to the load.

From FIG. 5, it will be seen that a counterclockwise flow toward the downstream side of a gas flow occurs in a small load range, and a clockwise flow toward the downstream side of the gas flow occurs in a large load range.

From the above phenomena, it is possible to determine the axial length and the number of stationary blades 10.

Figure 6A:
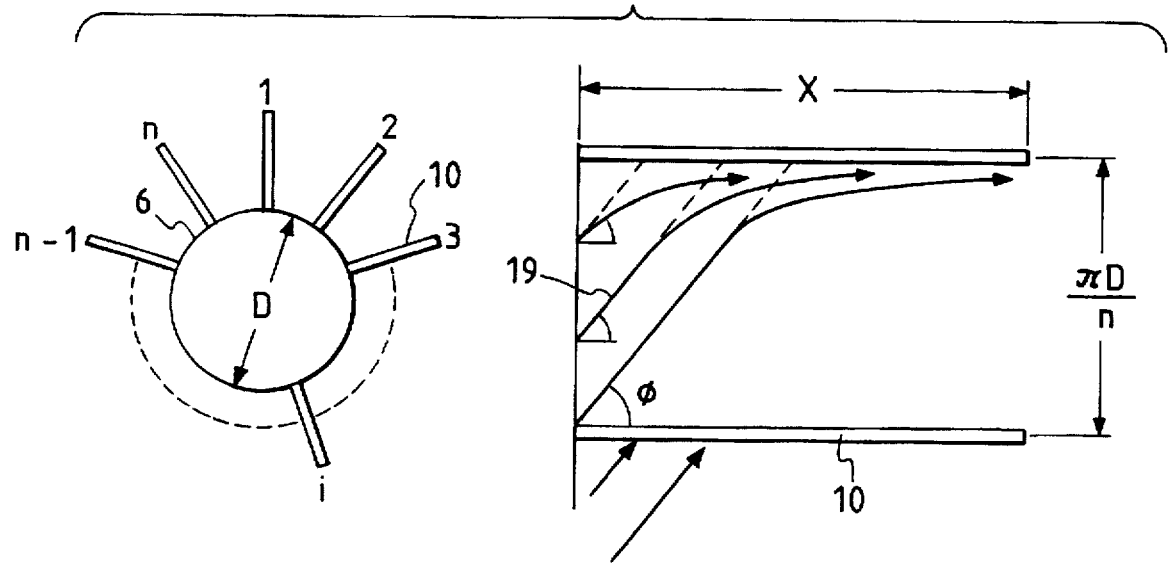
FIGS. 6a and 6b are illustrations showing the relation between the axial length and swirl angle of a stationary blade.

A method for determining the axial length and the number of stationary blades 10 will be described below referring to FIG. 6a.

Assume that n stationary blades with an axial length X are provided around the rear inner barrel 6. The condition for eliminating a swirl component when a swirl with an angle $\Theta$ enters the stationary blade can be expressed by a dimensionless parameter $\alpha$ ($=nX/D$), where D is the diameter of the rear inner barrel.

The swirl 19 entering the stationary blade 10 gradually decreases its angle $\Theta$ and the axial component becomes dominant.

Figure 6B:
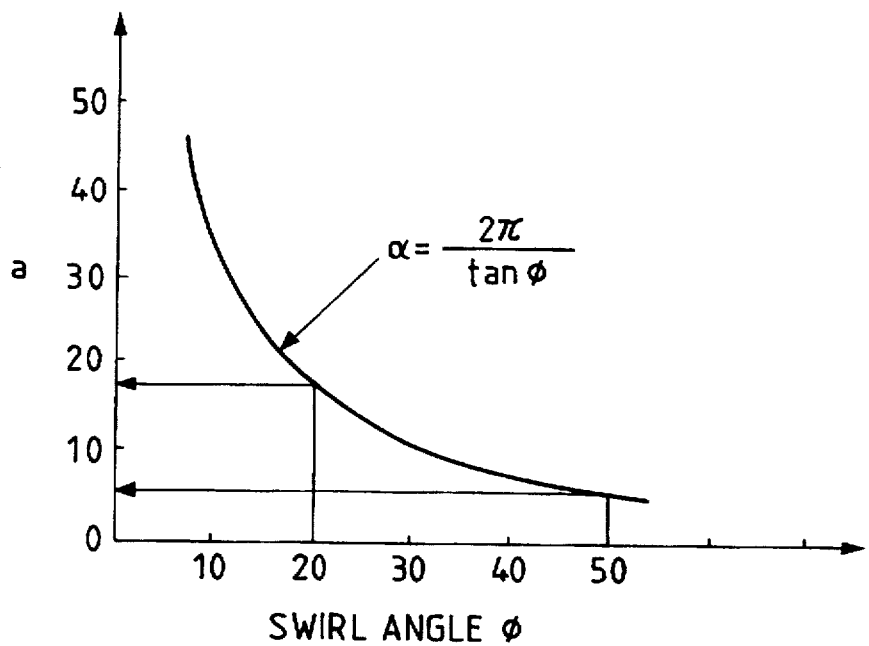

Assuming that the distance X for eliminating the swirl component is two times larger than the distance (extrapolated value) that the swirl reaches the stationary blade 10, the relation shown in FIG. 6b is established between the dimensionless parameter $\alpha$ and the angle $\Theta$, that is, the relation $\alpha-2\pi/\tan\Theta$ is effected.

Because the practical range of the absolute value |$\Theta$| of the angle $\Theta$ is considered to be 20° <|$\Theta$|<50°, the corresponding range of $\alpha$ is expressed by approximately 5 (5.3)<$\alpha$ 18 (17.3). The value of the parameter $\alpha$ can be up to 20. When the angle $\Theta$ is always 20° or less, the swirl component is small and therefore, it is considered that no stationary blade is necessary. Moreover, it is experientially considered that the angle $\Theta$ rarely is 50° or more.

When the number of stator vanes is 4 (n=4), the value X/D ranges from 1 to 5. Therefore, it is preferable that the axial length X of the stationary blade is set to a value 1 to 5 times larger than the diameter D of the rear inner barrel.

Therefore, it is possible to eliminate the swirl component by selecting the axial length and the number of stationary blades in the above manner.

However, if the number of stationary blades is increased more than necessary, the sectional area of the channel of exhaust gas is substantially decreased and the pressure drop increases. Therefore, it is preferable that the number of stationary blades is 8 or less in view of practical use.

Moreover, the angle $\Theta$ is so determined as to be always small. For example, the stationary blades of the embodiment may not be necessary for a gas turbine used for a jet engine of an aircraft.

As for a gas turbine used for a plant installed in a power plant, however, it is necessary to vary the load according to the demand of electric power. The angle Θ also changes accordingly. Therefore, such plants require stationary blades as shown in the present embodiment.

The stationary blades 10 control swirl. Therefore, the blades 10 make it possible to further improve the flow-straightening effect by forming the slits 9.

The function of the slits will be described below referring to FIG. 7a.

Figure 7A:
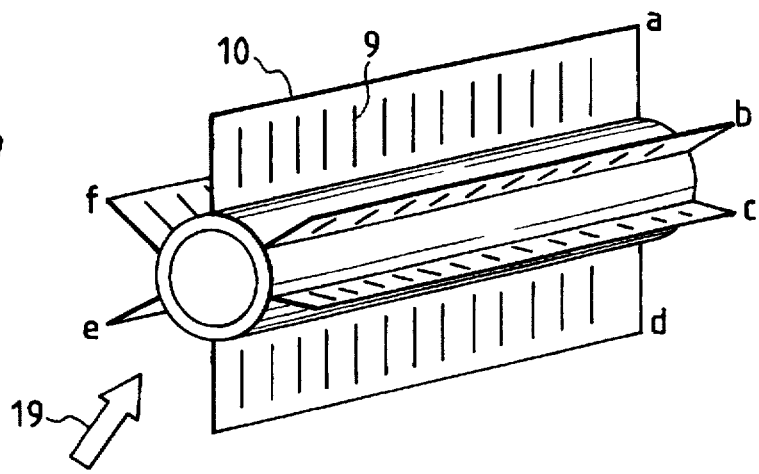
FIGS. 7a to 7d are illustrations showing the distribution of flow velocity and the pressure on a stationary blade having slits, in comparison with a stationary blade having no slits.
Figure 7B:
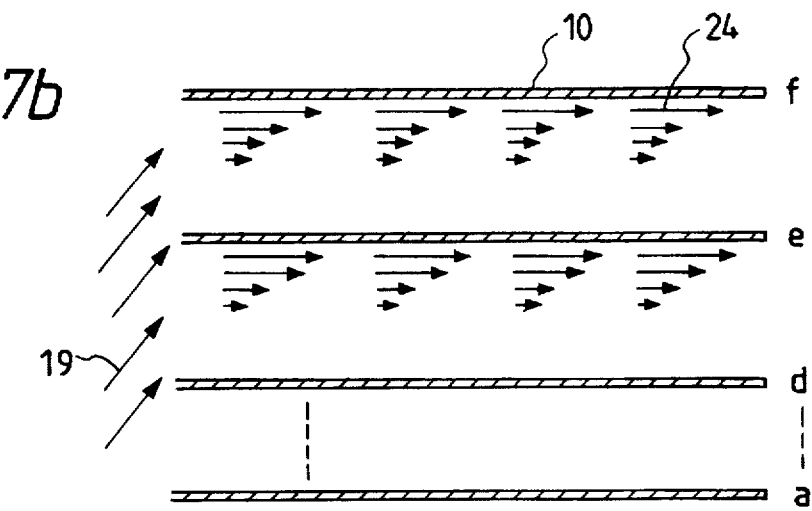
Figure 7C:
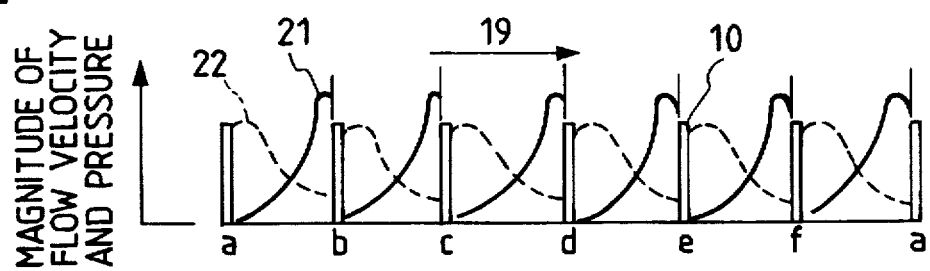

FIG. 7a schematically shows the stationary blades 10 formed on the rear inner barrel. The slits 9 are formed in the stationary blades 10 and the swirl 19 enters the blades 10. In the case of a stationary blade with no slit formed in it, as shown in FIG. 7b, the flow velocity 24 increases in the vicinity of the surface which the swirl 19 strikes and decreases on the back side. FIG. 7c shows a plan view of the stationary blade 10. This relation results in a phenomenon that the static pressure lowers at a portion where the flow velocity is high, and rises at a portion where the flow velocity is low in accordance with Bernoulli's law. (See the pressure distribution 22 and flow-velocity distribution 21 in FIG. 7c.)

Figure 7D:
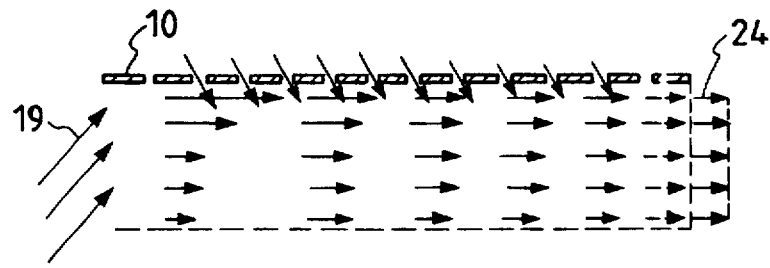

In this case, when the slits 9 are formed in the stationary blades 10, exhaust gas leaks from the surface of the stationary blade 10 where the static pressure is high to the surface where the static pressure is low. As a result, the uneven flow velocity distribution 21 is eliminated while exhaust gas is moving to the downstream side and an almost uniform distribution is formed near the rear edges of the stationary blades 10 as shown in FIG. 7d.

It is preferable that the slits 9 are formed in an oblong opening in the radial direction in view of the strength of the stationary blades 10.

However, the slits 9 can be of any shape, such as circles, as long as they fulfill their function.

It is preferable to form the slits 9 in order to further improve the heat transfer performance of a boiler located on the downstream side of an exhaust structure.

By forming the slits 9, the fluid forces acting on the stationary blades 10 can be decreased. Because the forces acting on the stationary blades 10 are produced by the difference between the pressures on the front surface and on the back of the blades, the slits 9 decrease the differential pressure and resultingly the forces acting on the stationary blades 10 can be decreased.

Figure 8:
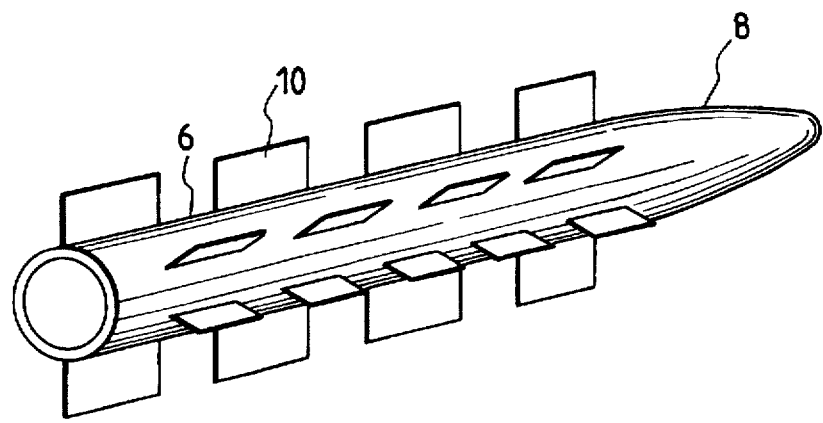
FIG. 8 is an illustration showing another embodiment of an exhaust gas structure of a gas turbine.

FIG. 8 shows another means for moderating the swirl component of the exhaust gas of a gas turbine. As shown in FIG. 8, it is also possible to form the stationary blades 10 by dividing them in the axial direction. In this case, the pressure drop may increase before the swirl component is completely eliminated because small eddies are produced near the rear edge of each stationary blade. However, the forces acting on the stationary blades 10 can be decreased.

The embodiment improves the efficiency of a plant in which a gas turbine and an exhaust heat recovery boiler are arranged along a shaft and an exhaust structure is provided with means for straightening the flow of exhaust gas.

Of course, even the stationary blades 10 having no slits 9 shown in FIG. 7b makes it possible to completely suppress swirl because the velocity component in the swirl direction can be deflected to that in the axial direction.

Moreover, because the channel area is gradually increased due to the provision of the rear edge boss, the problem of circulative flow is solved as well as the problem of swirl.

Therefore, a flow having a uniform distribution is formed in the channel cross section on the downstream side of the rear edge boss.

In particular, the embodiment has a remarkable effect on improving the performance of an axial flow exhaust plant in which a gas turbine and an exhaust heat recovery boiler are arranged on the same shaft.

What is claimed is:

1. A combined-cycle power generation plant, comprising:
   a gas turbine having a casing;
   an annular exhaust gas channel defined by a diffuser, an inner barrel, and a part of the casing for the gas turbine, said diffuser, said inner barrel, and said casing part being disposed on a downstream side of the gas turbine;
   an exhaust heat recovery boiler for producing steam by using exhaust gas of the gas turbine led through the annular exhaust gas channel; and
   a steam turbine driven by the steam;
   wherein the annular exhaust gas channel is provided with a plurality of stationary blades extending in an axial direction of the annular exhaust gas channel and in a radial direction of the annular exhaust gas channel so as to suppress a swirl component of the exhaust gas; and
   wherein the stationary blades are provided with openings for allowing exhaust gas to flow therethrough.

2. The combined-cycle power generating plant according to claim 1,
   wherein a number and axial length of the stationary blades are so determined that the value nX/D ranges between 5 and 20, wherein n is the number of stationary blades, X is the axial length of the stationary blades, and D is a diameter of the inner barrel.

3. The combined-cycle power generating plant according to claim 1,
   wherein the stationary blades allow the exhaust gas to flow in a peripheral direction of the inner barrel.

4. A combined-cycle power generation plant, comprising:
   a gas turbine having a casing;
   an annular exhaust gas channel defined by an inner barrel formed on a downstream side of the gas turbine, a rear edge boss connected with the inner barrel, the casing for the gas turbine, and a diffuser connected with the casing; and
   an exhaust heat recovery boiler for producing steam by using exhaust gas of the gas turbine led through the annular exhaust gas channel;
   wherein the inner barrel has an outer periphery provided with a plurality of stationary blades extending in an axial direction of the annular exhaust gas channel so as to suppress a swirl component of the exhaust gas;
   wherein the stationary blades are provided with openings for allowing exhaust gas to flow therethrough; and
   wherein a radius of the rear edge boss gradually decreases toward the downstream side of the gas turbine, and an axial length of the rear edge boss is 3 to 6 times larger than a diameter of the inner barrel.

5. A combined-cycle power generation plant, comprising:
   a gas turbine having a casing;
   an annular exhaust gas channel defined by an inner barrel formed on a downstream side of the gas turbine, a rear edge boss connected with the inner barrel, the casing for the gas turbine, and a diffuser connected with the casing; and
   an exhaust heat recovery boiler for producing steam by using exhaust gas of the gas turbine led through the annular exhaust gas channel;

wherein the inner barrel has an outer periphery provided with a plurality of stationary blades extending in an axial direction of the annular exhaust gas channel so as to suppress a swirl component of the exhaust gas; and wherein the stationary blades are provided with openings for allowing exhaust gas to flow therethrough.

6. A combined-cycle power generation plant, comprising:

a gas turbine having a casing;

an annular exhaust gas channel defined by an inner barrel formed on a downstream side of the gas turbine, a rear edge boss connected with the inner barrel, the casing for the gas turbine, and a diffuser connected with the casing; and an exhaust heat recovery boiler for producing steam by using exhaust gas of the gas turbine led through the annular exhaust gas channel;

wherein the inner barrel has an outer periphery provided with a plurality of stationary blades extending in an axial direction of the annular exhaust gas channel so as to suppress a swirl component of the exhaust gas;

wherein a radius of the rear edge boss gradually decreases toward the downstream side of the gas turbine, and an axial length of the rear edge boss is 3 to 6 times larger than a diameter of the inner barrel; and wherein the stationary blades are provided with openings for allowing exhaust gas to flow therethrough.

7. A combined-cycle power generation plant, comprising:

a gas turbine having a casing;

an annular exhaust gas channel defined by a diffuser, an inner barrel, and a part of the casing for the gas turbine, said diffuser, said inner barrel, and said casing part being disposed on a downstream side of the gas turbine;

an exhaust heat recovery boiler for producing steam by using exhaust gas of the gas turbine led through the annular exhaust gas channel; and a steam turbine driven by the steam;

wherein the annular exhaust gas channel is provided with a plurality of stationary blades extending in an axial direction of the annular exhaust gas channel and in a radial direction of the annular exhaust gas channel so as to suppress a swirl component of the exhaust gas;

wherein the stationary blades are arranged to direct the exhaust gas to flow in a peripheral direction of the inner barrel; and wherein the stationary blades are provided with openings for allowing exhaust gas to flow therethrough.

* * * * *